United States Patent [19]

Narita

[11] Patent Number: 5,060,309
[45] Date of Patent: Oct. 22, 1991

[54] INFRARED DETECTOR

[75] Inventor: Masaru Narita, Uji, Japan

[73] Assignee: Takenaka Engineering Co. Ltd., Kyoto, Japan

[21] Appl. No.: 392,983

[22] PCT Filed: Dec. 20, 1988

[86] PCT No.: PCT/JP88/01288

§ 371 Date: Jul. 26, 1989

§ 102(e) Date: Jul. 26, 1989

[87] PCT Pub. No.: WO89/05986

PCT Pub. Date: Jun. 29, 1989

[30] Foreign Application Priority Data

Dec. 22, 1987 [JP] Japan .......................... 62-194678[U]

[51] Int. Cl.$^5$ .......................................... H04B 10/10
[52] U.S. Cl. .................................. 359/154; 455/112; 455/216; 359/184
[58] Field of Search ............... 455/600, 617, 618, 619, 455/112, 216, 615; 370/3

[56] References Cited

U.S. PATENT DOCUMENTS

| | | | |
|---|---|---|---|
| 3,668,562 | 6/1972 | Fritkin | 455/112 |
| 3,798,547 | 3/1974 | Reudink | 455/216 |
| 3,805,192 | 4/1974 | Ocnaschek | 455/612 |
| 4,949,396 | 8/1990 | Chung | 455/216 |

FOREIGN PATENT DOCUMENTS 59-021132 5/1984 Japan .
60-178377 9/1985 Japan .

Primary Examiner—Reinhard J. Eisenzopf
Assistant Examiner—L. Pascal
Attorney, Agent, or Firm—Morgan & Finnegan

[57] ABSTRACT

An infrared detector device comprising a light projector adapted to output double-modulated infrared pulse light by modulating the amplitude of high frequency modulated light by means of low frequency waves, and a light receiver adapted to receive the double-modulated infrared pulse light. The light projector (1) comprises a 1/N-frequency dividing circuit (12) for dividing by N the frequency of the basic frequency signal from a basic frequency oscillator in such a manner that it can be set for switching, a second frequency dividing circuit (13) for dividing the frequency of the 1/N frequency-divided signal by a given factor to produce a low frequency signal, a frequency combining circuit (14) for combining the 1/N frequency-divided signal and the signal frequency-divided by a given factor, and a switch (17) for switching the frequency dividing factor for the 1/N-frequency dividing circuit (12). The light receiver (2) comprises a first tuning circuit (23) for selecting the optical signal on the basis of a frequency which corresponds to the 1/N-frequency-divided signal, a second tuning circuit (24) adapted to be tuned to the low frequency signal in the tuned signal from the first tuning circuit (23), the second tuning circuit (24) being provided with a PLL circuit, and a two-circuit ganged type changeover switch (26) for registering the first and second tuning frequencies with the respective frequencies of the set 1/N-frequency-divided signal and the signal frequency-divided by a given factor.

1 Claim, 3 Drawing Sheets

INFRARED DETECTOR

TECHNICAL FIELD

The present invention relates to an infrared type detecting device which emits infrared pulse light modulated to have periodicity and which produces a detection output when the infrared rays are obstructed, and particularly to an infrared type detecting device which uses double-modulated infrared pulse light, adapted to make it possible to change the modulating frequency.

BACKGROUND ART

A conventional modulated infrared type detecting device has its modulating frequency fixed from the outset and registers a frequency band received by a light receiver with a single modulating frequency fixed in pulse light emitted from a light projector. However, if there is any noise (disturbance light) which can be detected by the light receiver, there is the possibility of its irregular amplitude causing it to pass through a filter or tuning circuit subsequent to the light receiver to produce a light reception output (indicating that there is no intruder), even if such noise has no frequency which is the same as or similar to the modulating frequency for the infrared rays. Thus, to solve this problem, an infrared type warning device using double-modulated infrared pulse light as disclosed in Japanese Laid-Open Patent Publication No. 21132/1984 uses an emitter (light projector) of the type which modulates the amplitude of a high frequency signal by means of a low frequency signal, while employing in a receiving circuit a phase locked loop (hereinafter referred to as PLL) which follows the frequency and phase of an input signal, with the intention of providing a highly sensitive receiving device. That is, on the light receiving side of this apparatus, pulse light emitted from the light projector is highly sensitively received by a tuned amplifier and PLL, but it has been impossible to switch modulating and demodulating frequencies for high and low frequencies set in a warning device to other values.

DISCLOSURE OF INVENTION

When it is desired to monitor a vast field site by a plurality of infrared type detecting devices, in some cases two or more sets will be continuously arranged on a straight line. In other cases, infrared rays are set at two or more heights so as to effect monitoring by infrared rays arranged in two or more rows, and if detecting devices fixed in frequency to a single value are used, signal interference will take place between their respective light projectors and receivers, leading to malfunction. It will be readily seen that this often takes places in the case of the multi-row type with parallel monitoring lines. Even when two or more sets of light projectors and light receivers are continuously arranged with their respective monitor range defined by substantially straight lines or polygonal lines in very obtuse angles, the light from the endmost light projector reaches not only the light receiver corresponding thereto but also other remote light receivers; thus, even if infrared pulse light from the light projectors mated with such remote light receivers are cut off, the presence of the arrival light result in a so-called miswarning, i.e., failing to produce an intruder detection signal. To avoid these problems, it has been necessary to specially change the frequency for each monitor range. Particularly in the case of a detecting device using double-modulated infrared pulse light, both the light projector and the light receiver require frequency adjustment to be made at two or more places, making both manufacture and inspection complicated.

To solve these problems, the present invention provides a detecting device using double-modulated infrared pulse light and capable of high sensitivity reception, wherein switching between high and low frequencies for the light projector and light receiver is made possible, such switching between high and low frequencies being made possible by simply operating switch sections, one for each of the members, the light projector and light receiver. That is, the light projector is provided with an 1/N- frequency dividing circuit for dividing the basic frequency from an oscillating circuit to determine the higher frequency, and a second frequency dividing circuit for further dividing the output frequency from said 1/N- frequency dividing circuit at a fixed rate, so that the frequency outputted from the 1/N- frequency dividing circuit is switched by a frequency selecting switch section (and hence the output frequency from the second frequency dividing circuit is also automatically switched). The light receiver is provided with a first tuning circuit adapted to be tuned to the high frequency component of a received signal, a second tuning circuit using a PLL, and a single switch section connected to said first and second tuning circuits, said switch section being provided with a gang switch circuit for simultaneously switching the first and second tuning circuits.

According to such arrangement, there is realized a double-modulated infrared type detecting device arranged so that a change to a different frequency can be made by simply operating switches, one for each of the members, the light projector and light receiver.

BEST MODE FOR CARRYING OUT THE INVENTION

Figure 1:
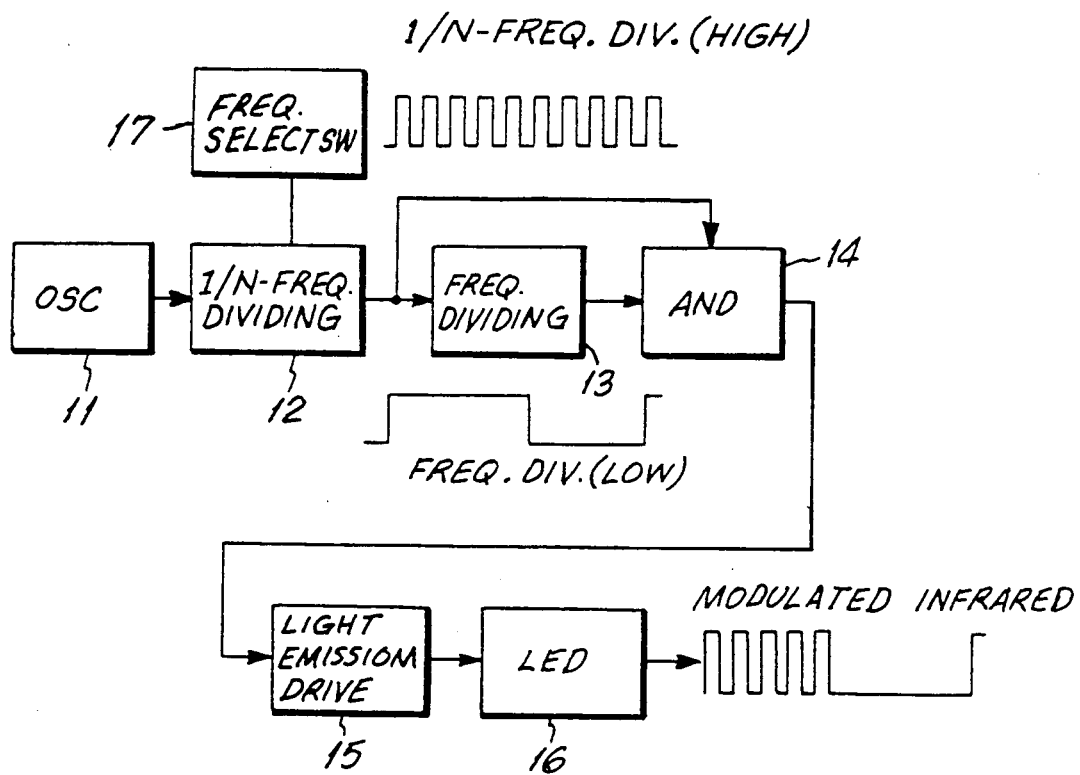
FIG. 1 is a block diagram showing an embodiment of a light projector in an infrared type detecting device according to the present invention.

FIG. 1 is a block diagram showing an example of arrangement of a light projector in an infrared type detecting device according to the invention. In a light projector 1, there are a basic frequency oscillating circuit 11, an 1/N- frequency dividing circuit 12 and a second frequency dividing circuit 3, which are successively connected together, and an AND circuit 14 for combining frequency signals with each other from said frequency dividing circuits, a light emission drive circuit 15 and an LED 16 serving as an infrared ray emitting element, said 1/N- frequency dividing circuit 12 having a frequency selecting switch 17 connected thereto.

In the above arrangement, the light projector 1 divides the frequency of a signal from the basic frequency oscillating circuit 11 by a switchable factor in the 1/N-frequency dividing circuit 12 and further divides it by a fixed factor through the frequency dividing circuit 13, these two frequency-divided signals being then combined in the AND circuit 14 to produce a double-modulated signal, which is then fed to the LED drive circuit 15, whose output drives the LED 16 to emit infrared pulse light. The output from the 1/N-frequency dividing circuit 12 is switchable by the frequency selecting switch 17, it being clear that high and low frequencies for double modulation are simultaneously switched by simply changing the frequency for the 1/N- frequency dividing circuit.

Figure 2:
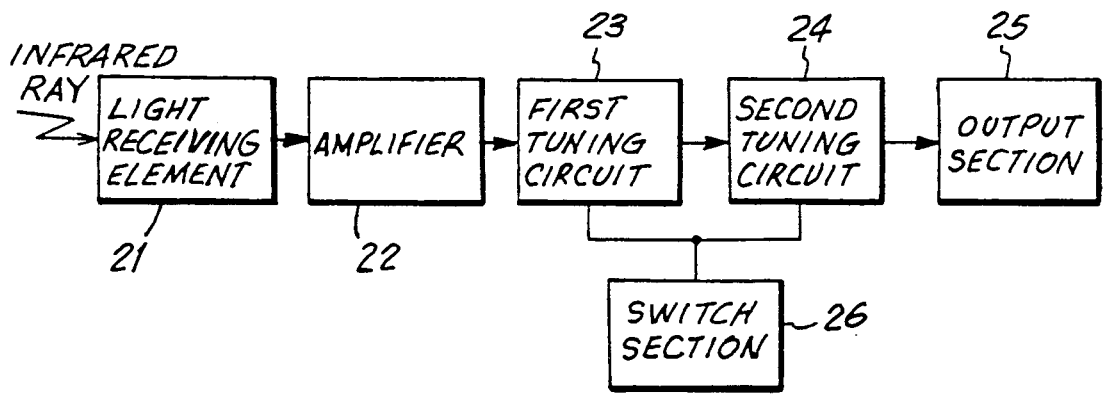
FIG. 2 is a block diagram showing an embodiment of a light receiver therefor.

FIG. 2 is a block diagram showing an example of the arrangement of a light receiver for the infrared type detecting device of the invention. A light receiver 2 comprises a light receiving element 21 in the form of a suitable photoelectric element, an amplifier 22, a first tuning circuit 23, a second tuning circuit 24 employing a PLL circuit, an output section 25 for driving suitable warning means, and a switch section 26 connected to the first and second tuning circuits 23 and 24 and having a two-circuit ganged switching function.

In the above circuit arrangement, the light receiver 2 amplifies the signal from the light receiving element 21 by the amplifier 22, and the frequency component tuned to the high frequency signal from the light projector by the positional setting of the switch section 26 is selectively amplified in the first tuning circuit 23 and fed to the second tuning circuit 24 using a PLL. Only the signal having the same frequency as that of the low frequency signal from the light projector 1 is received in this circuit 24 by means of the switch section 26 and is compared with an internal oscillation signal in the PLL section, which will output a coincidence signal only when they coincide with each other in both frequency and phase continuously for a predetermined period of time, said coincidence signal driving the output section 25. The switch section 26 is constructed so that it is capable of simultaneously switching the tuning frequencies for the first and second tuning circuits 23 and 24 in such a manner as to correspond to the output frequency at each setting time of the 1/N- frequency dividing circuit 12 of the light projector 1 and the output frequency of the frequency dividing circuit 13 at that time.

Figure 3:
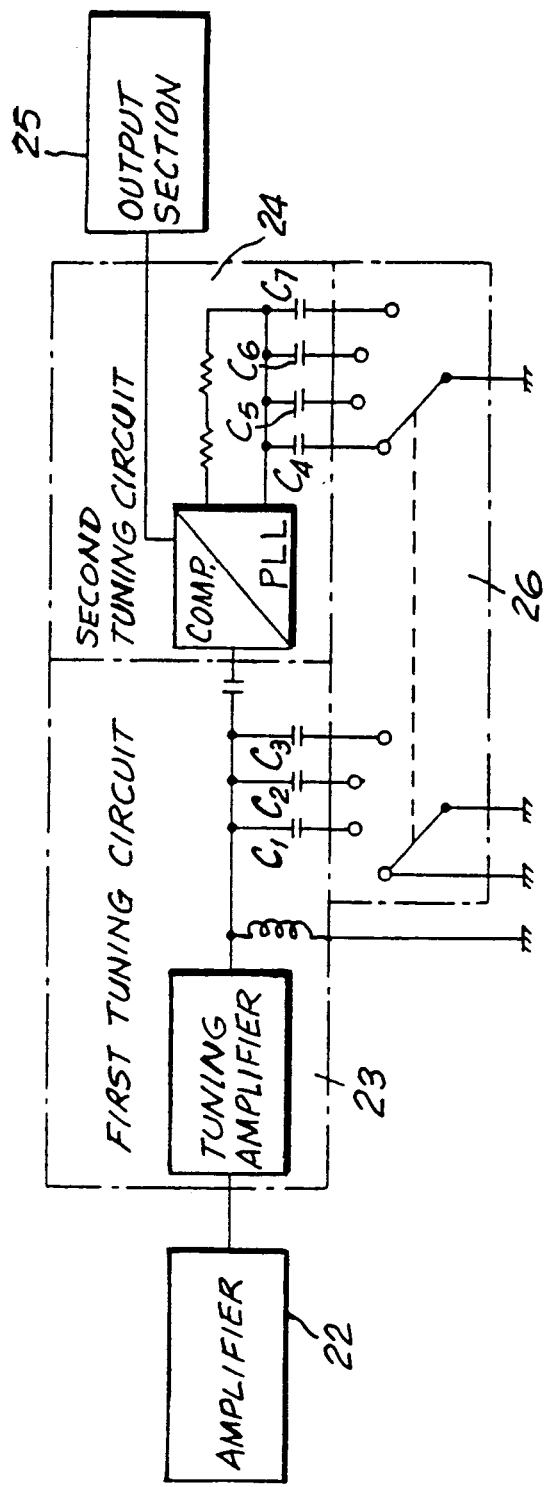
FIG. 3 is a circuit diagram showing a concrete example of a frequency switching section for the light receiver.

FIG. 3 is a view for explaining the section which switches two frequencies in the light receiver 2, and parts which exhibit the same functions are indicated by the same numerals as in FIG. 2. In this figure, capacitors C1-C3 and C4-C7 are elements for setting circuit constants for the tuning circuits 23 and 24, said elements having predetermined capacitances, selected from the E12 series, and electric connection is successively made between one of the respective ends and the ground terminal by the switching operation of the switch section 26 in combinations of 0-C4, C1-C5, C2-C5, and C3-C7. Therefore, by switching the switch section 26, the tuning frequency for high frequency waves can be changed in the first tuning circuit 23 and in the second tuning circuit the tuning frequency for low frequency waves can be changed simultaneously therewith. This switch section 26 may be replaced by an analogue multiplexer or a usual multipole switch.

According to the arrangement described above, frequency can be changed by simply effecting a switching operation at one place in the light projector and light receiver, respectively. And even in the case where a plurality of detecting devices are disposed in a line or multi-row, the frequencies for double modulation of infrared rays can be suitably changed according to the respective places of installation.

Figures 4A, 4B, 4C, 4D:
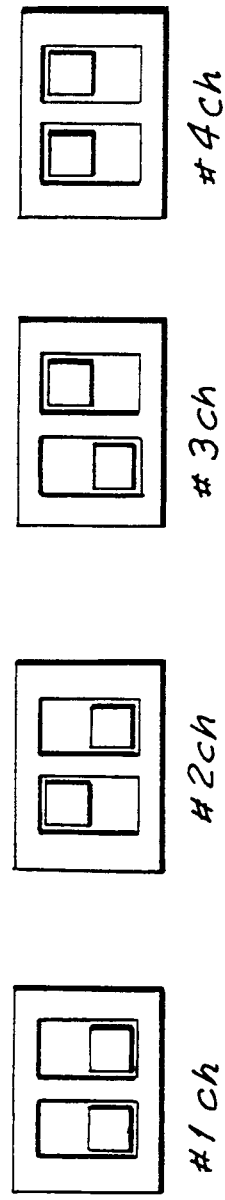
FIGS. 4a, 4b, 4c and 4d are front views showing embodiments of frequency changeover switches for the light receiver and light projector; and FIGS. $5a_1$, $5a_2$, $5b_1$, $5b_2$, $5c_1$, $5c_2$ and $5d$ are schematic views showing the disposition of the light projector and light receiver and an example of selection of frequency.

FIG. 4 shows a dip type twin tumbler switch employed in the case where frequencies for double modulation in 4 stages are made selectable in the switch section 17 of the light projector 1 and the switch section 26 of the light receiver 2, respectively. It is arranged that a first combination (first channel) of two frequencies is obtained when both of the tumblers 27a and 27b of a switch 27 are lowered as shown at (a) in the same figure, a second combination (second channel) is obtained when one tumbler 27a alone is raised as shown at (b) in the same figure, a third combination (third channel) is obtained when the other tumbler 27b alone is raised as shown at (c) in the same figure, and a fourth combination (fourth channel) is obtained when both tumblers are raised as shown at (d) in the same figure. Assuming that the basic frequency is 100 KHz, the combinations of frequencies in the respective channels are, for example, as follows.

|  | High frequency (factor) (KHz) | Low frequency (factor) (Hz) |
| --- | --- | --- |
| First channel (# 1 ch) | 25.0 (¼) | 625 (1/40) |
| Second channel (# 2 ch) | 20.0 (1/5) | 500 (1/40) |
| Third channel (# 3 ch) | 16.7 (1/6) | 417 (1/40) |
| Fourth channel (# 4 ch) | 14.3 (1/7) | 357 (1/40) |

FIG. 5 is a schematic view showing detecting device disposition and channel combinations in conventional modulating frequency-fixed systems a1, b1 and c1 and present inventive channel changing systems a2, b2, c2 and d, wherein double semicircles indicate light projectors, single semicircles indicate light receivers receiving infrared rays and tunablly detecting, and black circles indicate light receivers not receiving infrared rays or though receiving them, not tunablly detecting (intruder detecting state).

That is, in the case of polygonal line dispositions a1 and a2, even if the light from the right-hand side light projector 1R is interrupted by an obstacle M, infrared rays from the left-hand side light projector 1L impinge on the light receiver 2R associated therewith. Thus, in the conventional system a1, this state is directly detected (deciding that there is no intruder); however, in the present inventive system a2, only the channel #2 is detected in the light receiver 2R, so that there is no possibility of failing to notice an intruder. Further, b1 and b2 show two parallel rows, one above the other. In the present inventive system b2, even if infrared rays from the upper light projector 1A impinge on the lower light receiver 2B, it is not tunablly detected since the channel differs. Further, c1 and c2 show two rows in cross relation. In the conventional system c1, even if the upper and lower monitoring lines are interrupted by an intruder or the like M, the light reflected from the obstacle (intruder or the like) M is sometimes detected by the light receiver 2B or 2A positioned immediately below or above the light projector 1A or 1B. However, in the present inventive system c2, it is obvious that such drawback can be eliminated.

Figure 5D:
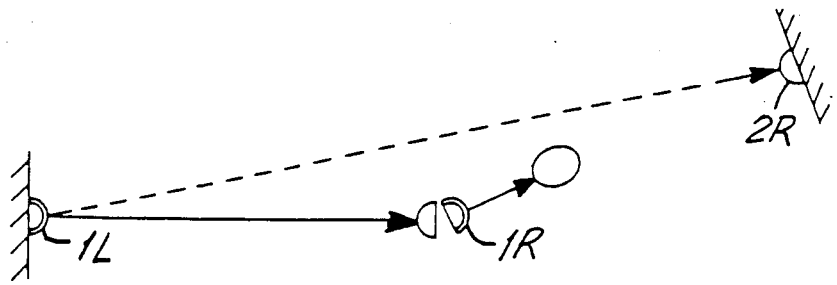
Figure 5D:
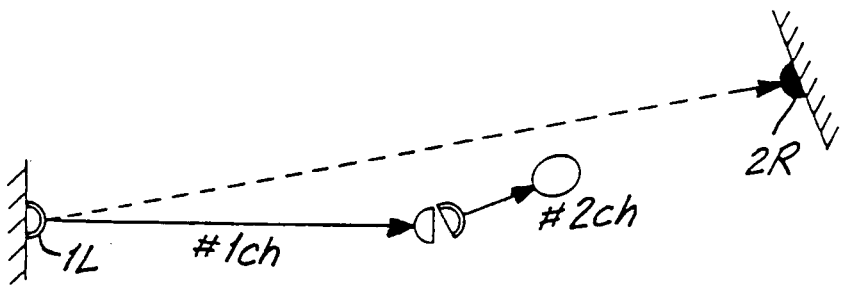
Figure 5D:
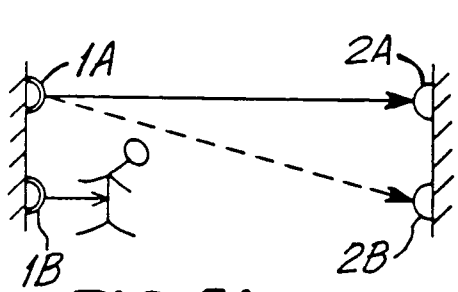
Figure 5D:
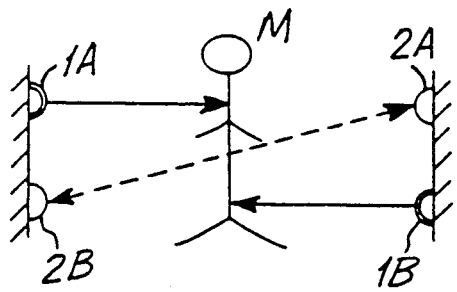
Figure 5D:
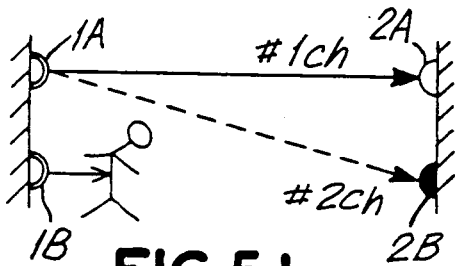
Figure 5D:
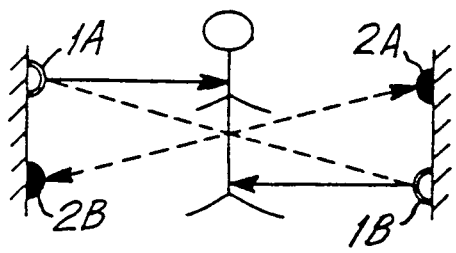
Figure 5D:
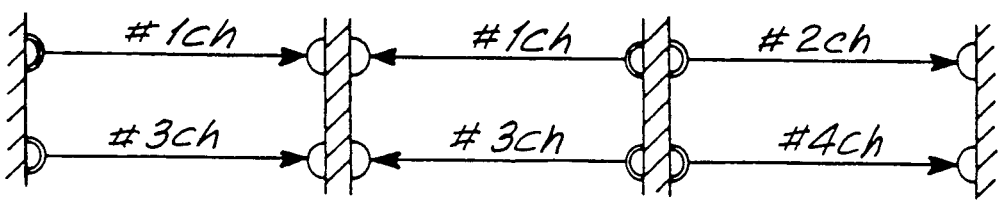

FIG. 5(d) shows a straight line (three segments) two-row arrangement. It will be understood that if the four channels are distributed in the present inventive system, this indicates a manner capable of forming a warning network without any danger of radio interference or malfunction.

INDUSTRIAL APPLICABILITY

As has been described so far, according to the present invention, it is possible to avoid erroneous information due to signal interference between a plurality of detecting devices.

In other words, the present invention solves the problem associated with the installation of light projectors and light receivers and, besides improving the reliability of this type of detecting devices, has remarkable merits.

In addition, in the basic frequency oscillating circuit for the light projector, if crystal oscillators and ceramic oscillators are used to improve the accuracy while on the light receiver side, tuning frequencies at the respective switch positions of the first and second tuning circuits are controlled within a given range by the switch arrangement shown in FIG. 2, then the adjusting step in the manufacture of light projectors and light receivers can be omitted, resulting in a reduction in production cost.

In addition, such multi-channel monitoring system may be used for other purposes than prevention of crimes, such as the monitoring of production line, and in that case, light rays other than infrared rays may be used or a suitable wave signal may be employed.

I claim:

1. An infrared detector including a light projector adapted to output double-modulated infrared pulse light by modulating the amplitude of high frequency modulated light by means of low frequency waves, and a light receiver adapted to receive said double-modulated infrared pulse light, said infrared detector characterized in that:

said light projector (1) comprises a basic frequency oscillating circuit (11), an 1/N- frequency dividing circuit (12) for dividing by N the frequency of the basic frequency signal from said oscillating circuit so that it can be switchably set, a second frequency dividing circuit (13) for dividing the frequency of the 1/N- frequency-divided signal by a given factor to produce a low frequency signal, a frequency combining circuit (14) for combining said 1/N-frequency-divided signal and the signal frequency-divided by a given factor, a light emission drive circuit (15) for receiving the double-modulated signal from said combining circuit (14), a light emitting element (16) adapted to produce double-modulated infrared rays by the output of said light emission drive circuit (15), and a switch (17) for switching the frequency dividing factor for said 1/N-frequency dividing circuit (12), and said light receiver (2) comprises a light receiving element (21) for receiving the infrared rays from said light projector (1), a first tuning circuit (23) for selecting the optical signal received by the light receiving element (21) on the basis of a frequency which corresponds to said 1/N- frequency-divided signal, a second tuning circuit (24) adapted to be tuned to said low frequency signal in the selected signal from said first tuning circuit (23), a warning output section (25) adapted to receive the output signal from said second tuning circuit (24), said second tuning circuit (24) being provided with a PLL circuit, and a two-circuit ganged type selector switch (26) connected to said first and second tuning circuits (23, 24) for registering said first and second tuning frequencies with the respective frequencies of the set 1/N- frequency-divided signal and the signal frequency-divided by a given factor.

* * * * *